United States Patent
Wright et al.

(10) Patent No.: US 7,325,030 B2
(45) Date of Patent: Jan. 29, 2008

(54) HIGH PERFORMANCE CLIENT-SERVER COMMUNICATION SYSTEM

(75) Inventors: Robert A. Wright, Albuquerque, NM (US); Farzad Nazem, Santa Clara, CA (US)

(73) Assignee: Yahoo, Inc., Santa Clara, CA (US)

( * ) Notice: Subject to any disclaimer, the term of this patent is extended or adjusted under 35 U.S.C. 154(b) by 614 days.

(21) Appl. No.: 09/770,762

(22) Filed: Jan. 25, 2001

(65) Prior Publication Data

US 2002/0099768 A1 Jul. 25, 2002

(51) Int. Cl.
*G06F 15/16* (2006.01)
*G06F 3/00* (2006.01)
*G06F 12/00* (2006.01)
*G06F 9/44* (2006.01)

(52) U.S. Cl. .......... 709/203; 709/204; 709/245; 710/52; 707/204; 717/130; 719/328; 719/330

(58) Field of Classification Search ............... 709/203, 709/238, 204, 245; 707/204; 710/52
See application file for complete search history.

(56) References Cited

U.S. PATENT DOCUMENTS

| | | | |
|---|---|---|---|
| 5,699,523 A | 12/1997 | Li et al. | 395/200.15 |
| 5,850,517 A | 12/1998 | Verkler et al. | 395/200.32 |
| 5,867,661 A | 2/1999 | Bittinger et al. | 395/200.57 |
| 5,870,559 A | 2/1999 | Leshem et al. | |
| 5,881,230 A * | 3/1999 | Christensen et al. | 709/203 |
| 5,905,872 A | 5/1999 | DeSimone et al. | 395/200.75 |
| 5,950,195 A | 9/1999 | Stockwell et al. | |
| 5,974,566 A | 10/1999 | Ault et al. | 714/15 |
| 5,983,227 A | 11/1999 | Nazem et al. | 707/10 |
| 5,983,350 A | 11/1999 | Minear et al. | |
| 5,987,476 A | 11/1999 | Imai et al. | 707/201 |
| 5,987,506 A | 11/1999 | Carter et al. | |

(Continued)

FOREIGN PATENT DOCUMENTS

EP 0 954 138 A 11/1999

OTHER PUBLICATIONS

Hadjiefthymiades, S. et al. "Improving the performance of CGI compliant database gateways," Computer Networks and ISDN Systems, North Holland Publishing, Amsterdam, NL 29(8-13)1291-1294.

(Continued)

*Primary Examiner*—Jeffrey Pwu
*Assistant Examiner*—Philip Lee
(74) *Attorney, Agent, or Firm*—Hickman Palermo Truong & Becker LLP

(57) ABSTRACT

A communication system includes a client and a sever. The client has a first proxy, a first memory, and a plurality of first processes. The first memory includes a plurality of first slots, each first slot being assigned to one of the plurality of first processes and configured to store data to be transmitted or received by the assigned first process. The server has a second proxy, a second memory, and a plurality of second processes. The second memory includes a plurality of second slots being assigned to one of the plurality of second processes and configured to store data to be transmitted or received by the assigned second process. The first proxy and second proxy are configured to form a communication link with the other.

12 Claims, 4 Drawing Sheets

U.S. PATENT DOCUMENTS

| | | | |
|---|---|---|---|
| 5,991,756 A | 11/1999 | Wu | 707/3 |
| 5,991,810 A | 11/1999 | Shapiro et al. | |
| 6,006,268 A | 12/1999 | Coile et al. | 709/227 |
| 6,073,175 A | 6/2000 | Tavs et al. | |
| 6,148,336 A | 11/2000 | Thomas et al. | |
| 6,148,337 A | 11/2000 | Estberg et al. | |
| 6,205,489 B1* | 3/2001 | Kapoor | 709/245 |
| 6,311,216 B1 | 10/2001 | Smith et al. | |
| 6,314,459 B1 | 11/2001 | Freeman | |
| 6,321,336 B1 | 11/2001 | Applegate et al. | |
| 6,338,079 B1 | 1/2002 | Kanamori et al. | |
| 6,507,577 B1 | 1/2003 | Mauger et al. | |
| 6,542,468 B1 | 4/2003 | Hatakeyama | |
| 6,557,056 B1* | 4/2003 | Lanteigne et al. | 710/52 |
| 6,594,671 B1 | 7/2003 | Aman et al. | |
| 6,597,699 B1 | 7/2003 | Ayres | |
| 6,618,761 B2 | 9/2003 | Munger et al. | |
| 6,625,624 B1* | 9/2003 | Chen et al. | 707/204 |
| 6,687,739 B2* | 2/2004 | Anupam et al. | 709/204 |
| 6,704,807 B1* | 3/2004 | Mathur et al. | 719/328 |
| 6,757,250 B1 | 6/2004 | Fayad et al. | |
| 6,760,903 B1* | 7/2004 | Morshed et al. | 717/130 |
| 6,792,461 B1 | 9/2004 | Hericourt | |
| 6,792,463 B1 | 9/2004 | Lamberton et al. | |
| 6,865,151 B1 | 3/2005 | Saunders | |
| 6,868,448 B1 | 3/2005 | Gupta et al. | |
| 6,931,600 B1 | 8/2005 | Pittman | |
| 6,941,561 B1* | 9/2005 | Kasichainula et al. | 719/330 |
| 2001/0032273 A1 | 10/2001 | Cheng | |
| 2002/0059503 A1* | 5/2002 | Dennie | 711/153 |
| 2002/0078164 A1 | 6/2002 | Reinschmidt | |
| 2002/0078371 A1* | 6/2002 | Heilig et al. | 713/200 |
| 2002/0099768 A1 | 7/2002 | Wright et al. | |
| 2002/0099829 A1 | 7/2002 | Richards et al. | |
| 2002/0129082 A1 | 9/2002 | Baskey et al. | |
| 2005/0160137 A1 | 7/2005 | Ishikawa et al. | |

OTHER PUBLICATIONS

Dias, D. et al. (1996). "A scalable and highly available web server," Digest of Papers of COMPCON (Computer Society Conference) 1996 Technologies for the Information Superhighway. Santa Clara, Feb. 25-28, 1996, Digest of Papers of the Computer Society Computer Conference COMPCON, Los Alamitos, IEEE Comp. Soc. Press, 85-92.

H. Meling, A. Montresor, O. Babaoglu, B. Helvik, "Jgroup/ARM: A Distributed Object Group Platform with Autonomous Replication Management for Dependable Computing", pp. 1-35, www.CS.UniBO.it/babaoglu/papers/jgroup-arm.pdf.

Z. Genova, K. Christensen, "Challenges in URL Switching for Implementing Globally Distributed Web Sites", (2000) www.csee.usf.edu/~christen/sws00.pdf.

Gaurav Banga, P. Druschel, J. Mogul, "Resource Containers: A New Facility for Resource Management in Server Systems", (1999) www.cs.rice.edu/~gaurav/papers/osdi99.ps.

J. Kangasharju, Y. Kwon, A. Ortega, X. Yang, K. Ramchandran, "Implementation of Optimized Cache Replenishment Algorithms In A Soft Caching System", (1998) □□www.eurecom.fr/~kangasha/Publications/OptimalSoft.ps.gz.

J. Pitkow, "Summary of WWW Characterizations", (1998) □□www.parc.Xerox.com/istl/groups/uir/pubs/pdf/UIR-R-1998-12-Pitkow-WWW.7-Summary.pdf.

H. Chen, A. Joshi, T. Finin, "Dynamic Service Discovery for Mobile Computing: Intelligent Agents Meet Jini in the Aether", (2001) □□research.ebiquity.org/docrepos/2001/paper/bsjcc2001.pdf.

John Dilley et al., "Improving Proxy Cache Performance: Analysis of Three Replacement Policies," *Internet Computing*, IEEE, vol. 3, Issue 6, Nov.-Dec. 1999 pp. 44-50.

Richard M. Mortier, "Multi-Timescale Internet Traffic Engineering," *Communications Magazine*, IEEE vol. 40, Issue 10, Oct. 2002, pp. 125-131.

"Communication purusnt to Article 96(2) EPC" received in corresponding European application No. 02 250 510.1 -2212 (8 pages), Aug. 17, 2006.

* cited by examiner

HIGH PERFORMANCE CLIENT-SERVER COMMUNICATION SYSTEM

BACKGROUND OF THE INVENTION

The present invention relates to a communication system. More specifically, the invention relates to a client-server communication system which includes a plurality of proxies to provide rapid client-server communication.

The client-server communication system is a system that has at least one requesting party and at least one responding party which services the requesting party. One example of a client-server communication system is a global internetwork of networks, known as the Internet. The Internet uses the TCP/IP (Transport Control Protocol/Internet Protocol) for reliably passing data packets from a source node, which may be a client or server, to a destination node, which also may be a client or server. A variety of higher level protocols are used on top of TCP/IP to transport objects of digital data, the particular protocol depending on the nature of the objects. For example, email is transported using the Simple Mail Transport Protocol (SMTP) and the Post Office Protocol 3 (POP3), while files are transported using the File Transfer Protocol (FTP). Hypertext documents and their associated effects are transported using the Hypertext Transport Protocol (HTTP).

When many hypertext documents are linked to other hypertext documents, they collectively form a "web" structure, which led to the name "World Wide Web" (often shortened to "WWW" or "the Web") for the collection of hypertext documents that can be transported using HTTP. Of course, hyperlinks are not required in a document for it to be transported using HTTP. In fact, any data object can be transported using HTTP, so long as it conforms to the requirements of HTTP.

In a typical use of HTTP, a browser sends request for an object, the request including a Uniform Resource Locator (URL) to a host, and the host returns the object (or an error message indicating the unavailability of the object) for the browser to display. In a common instance, the requested object is a Hypertext Markup Language (HTML) document and the host is an HTML document server typically referred to as a "Web server." The browser is one example of an HTTP client and is so named because it displays the returned hypertext document and allows the user an opportunity to select and display other hypertext documents referenced in the returned document, thus allowing the user to "browse" hypertext documents. The Web server is an Internet host which returns hypertext documents and other data objects requested by HTTP clients.

SUMMARY OF THE INVENTION

The present invention relates to a client-server communication. In one embodiment of the present invention, a communication system includes a client and a server. The client has a first proxy, a first memory, and a plurality of first processes. The first memory includes a plurality of first slots, each first slot being assigned to one of the plurality of first processes and configured to store data to be transmitted or received by the assigned first process. The server has a second proxy, a second memory, and a plurality of second processes. The second memory includes a plurality of second slots that can be assigned to one of the plurality of second processes and configured to store data to be transmitted or received by the assigned second process. The first proxy and second proxy are configured to form a communication link with the other.

DESCRIPTION OF THE SPECIFIC EMBODIMENTS

The present invention relates to a client-server communication. The present invention has been illustrated using specific embodiments of the invention. It should be understood that the present invention is not limited to these specific examples, but is limited only by the appended claims.

Figure 1:
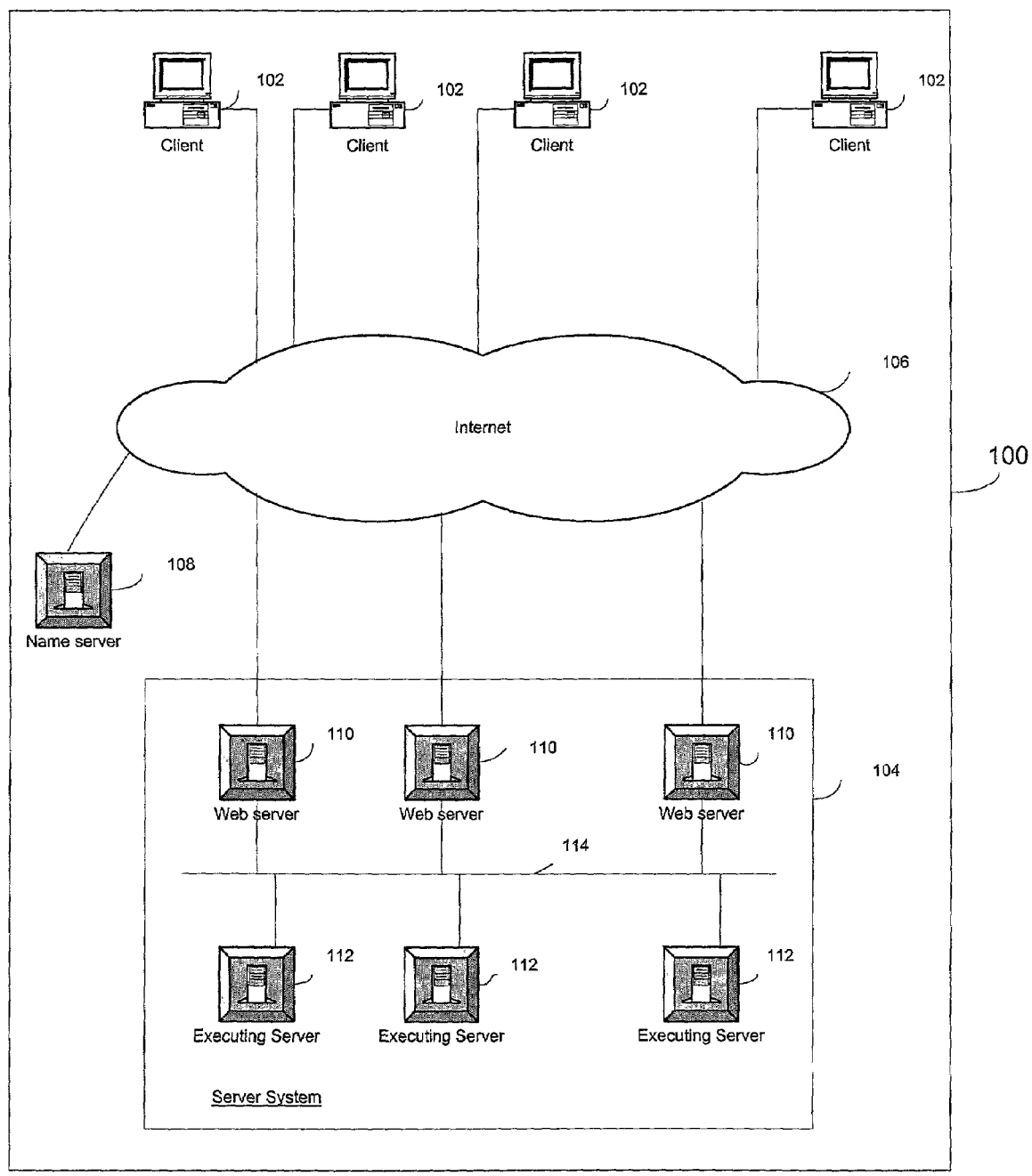
FIG. 1 is a schematic diagram of a client-server system according to one embodiment of the present invention.

Referring to FIG. 1, a client-server system 100 includes a plurality of clients (or browsers) 102 which are connected to a server system or a plurality of servers 104 via Internet 106. System 100 may include a name server 108 which assists clients 102 in establishing a communication link with server system 104. As described in more detail below, server system 104 itself constitues a client-server system having at least one requesting party and at least one responding party.

Clients 102 may be the actual machines or software residing in such machines that are capable of interfacing directly or indirectly to the Internet. Examples of such machines are desktop personal computers, workstations, cellular telephones, personal digital assistants, laptops, and the like. Examples of such software are Netscape Navigator, Microsoft Internet Explorer, and the like. These software are generally referred to as browsers since they are used to browse the data available on the Internet. The term "browser" is used interchangeably with client 102 hereinafter merely for purposes of describing the invention and should not be used to limit the scope of the present invention.

Server system 104 includes a plurality of Web servers 110 (clients/servers) connected to a plurality of executing servers 112 (clients/servers) via a link 114 such as intranet, internet, wide area network, or the like. In other implementations, Web servers 110 may be other types of servers. Web server 110 receives requests from browser 102 which are routed to executing servers 112 to retrieve the requested data. The term "routed" is used broadly here to include transporting any data or requests transmitted by the Web server to the executing servers in response to the request received from the browser. For example, Web server 110 may generate and transmit multiple requests to executing servers 112 in order to respond to a single request sent by the browser.

Once the requested data is received from one or more of executing servers 112, Web server 110 forwards the data to browser 102 for viewing by a user. Before forwarding the data received from the executing servers, they are generally reformatted, combined with other data similarly retrieved, or combined with data stored locally on one or more executing servers 112. In this sense, Web servers 110 function both as clients and servers: they are clients with respect to executing servers 112 and servers with respect to browsers 102.

In one embodiment, Web servers 110 and executing servers 112 are microcomputers running the Unix® operating system. Generally, server system 104 has up to twenty Web servers 110 and up to ten executing servers 112. Alternatively, server system 104 may have more Web and executing servers 110 and 112. Each of the Web and executing servers runs a plurality of processes or applications, generally, up to twenty, but sometimes more.

Figure 2:
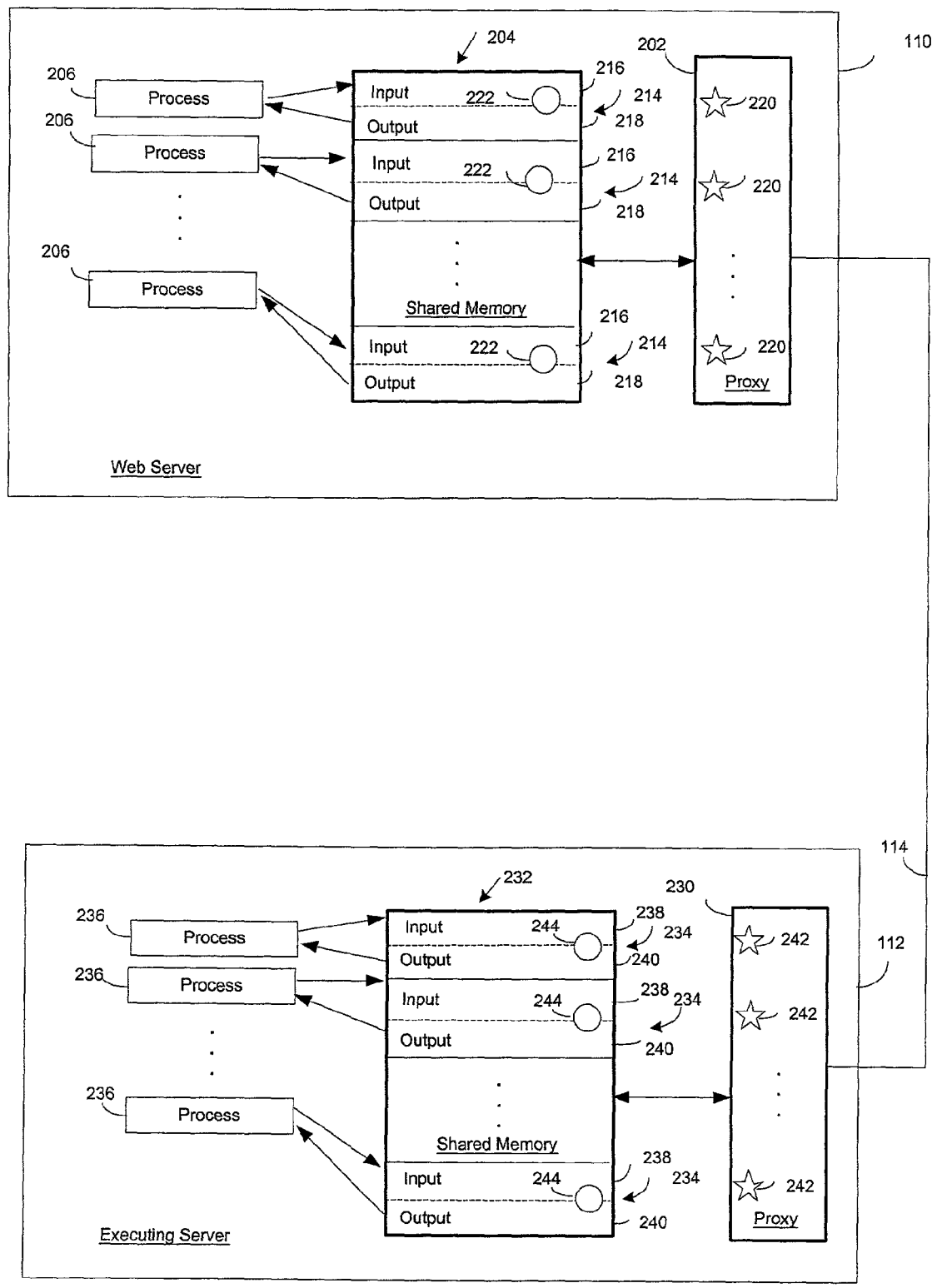
FIG. 2 is a schematic diagram of two exemplary servers in the client-server system of FIG. 1.

Referring to FIG. 2, each of Web servers 110 connected to communication link 114 includes a proxy 202 which maintains an enduring TCP/IP connection with the proxies of executing servers 112, a shared memory 204, and a plurality of processes 206. The enduring connection provided by the proxies allows for more efficient use of the resources of server system 104. The connection between proxies are described as "enduring" because the connection is maintained as long as the servers of the proxies are actively connected to system 100.

Generally, all communication amongst the processes of Web servers 110 and executing servers 112 are performed via the enduring connection provided by the proxies of the respective servers. Without such a connection, each of the processes would need to establish independent, temporary connections to all of the processes to which the former desires to communicate. This may mean establishing and maintaining tens of thousands or more independent connections amongst the processes. Significant resources would be needed to implement such a system. The connection formed by the processes are described as "temporary" because the connection is established between two processes only long enough to carry out the desired communication and is terminated once the communication has been concluded.

Shared memory 204 is organized as a memory mapped file that can be accessed by more than one process in a multitasking operating system with memory protection. Processes 206 are HTTP servers running on Web servers 110 to handle requests submitted by browser 102. Examples of such processes are Apache from the Apache Software Foundation and other similar HTTP servers. The shared memory includes a plurality of slots 214 whose number generally equals the maximum number of processes 206 that can be handled by Web server 110, so that each slot is assigned to a distinct process.

In one embodiment of the present invention, shared memory 204 includes N slots 214 to correspond to the maximum of N processes that can be handled by the Web server under this embodiment. In one implementation, N is 20 but other values of N may be possible depending on loads and the capabilities of the servers.

Each slot 214 includes an input space 216 and an output space 218. The input space receives and temporarily stores data from its corresponding process 206, so that the data may be subsequently transmitted to executing servers 112 via proxy 202. The output space, on the other hand, receives and temporarily stores data received from executing servers 112 by proxy 202, so that process 206 of the Web server may access the data. In one implementation, each slot 214 has 4 k of memory space, where input space 216 and output space 218 each is allotted 2 k of memory spaces.

Figure 3A:
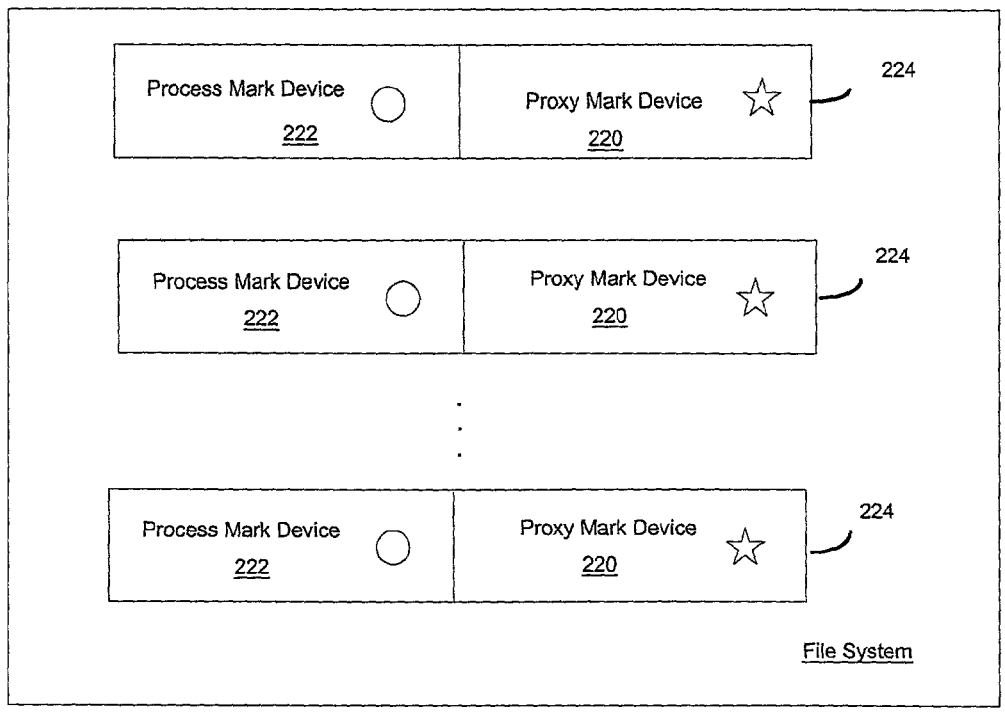
FIG. 3A depicts a schematic representation of a process mark device according to one embodiment of the present invention.

For each shared memory slot 214, there is a corresponding mark device pair 224 consisting of a proxy mark device 220 and a process mark device 222 (see, FIG. 3A) to regulate the data flow within the shared memory slot 214 to which they correspond. The proxy mark devices are associated with proxy 202, and the process mark devices are associated with processes 206. These mark devices are virtual device drivers that are maintained in a file system under a given directory, e.g., "/dev/mkd/." However, for purposes of illustration, the proxy and process mark devices are drawn to be included within the proxy and shared memory, respectively, in FIG. 2.

Each of proxy and process mark devices 220 and 222 maintains two independent sets of mode: a read mode and a write mode. The read mode has two states: "readable" or "not readable." The write mode has two states: "writable" or "not writable." These modes and states regulate data flow between the proxy and process.

When a process 206 wishes to send a message or request data to executing server 112 via proxy 202, it first determines whether its input space 216 is available to receive data by checking the process mark device. If the process mark device is in "not writable" state, the process must wait. The "not writable" state indicates that the proxy has not yet read the last message placed in the input space 216. In other words, the proxy mark device is in "readable" state.

Once the last message has been read out, the proxy mark device changes to "not readable" state. The process mark device 222, in turn, switches to "writable" state, indicating that the input space is available to receive a new message. The process 206 can then copy the request data into the input space 216 and write the process mark device 222 to indicate that the request data has been copied into the input space. The act of writing the process mark device 222 causes the process mark device 222 to become "not writable" and the corresponding proxy mark device 220 to become "readable."

The change in the proxy mark device 220 to "readable" alerts the proxy that there is data to be read out in the corresponding input space 216. The proxy can then read the data from the input space 216 and then read the proxy mark device 220 to indicate that the data has been accepted for delivery. The act of reading the proxy mark device 220 causes it to become "not readable" and the corresponding process mark device 202 to become "writable" again.

The transfer of data from the proxy 202 to a process 206 generally operates in a similar manner. The proxy must first determine whether the output space 218 is available by checking the proxy mark device 220. If it is in "writable" state, the proxy may write the data into the output space 218 and write the proxy mark device 220 to indicate that the data has been written into the output space. Writing the proxy mark device 220 causes it to be "not writable" and the corresponding process mark device 222 to be "readable" indicating to the process 206 that data is available to be read out from the output space. The proxy mark device remains in "not writable" state until the process has performed a read for the corresponding process mark device 222.

Figure 3B:
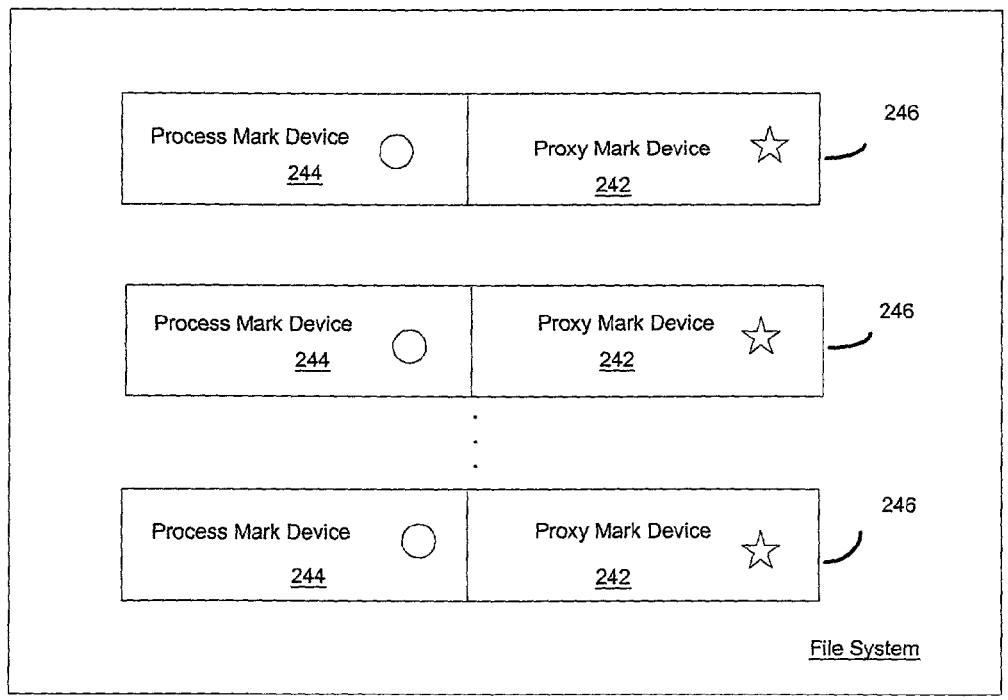
FIG. 3B depicts a schematic representation of a proxy mark device according to one embodiment of the present invention.

Referring back to FIG. 2, like Web servers 110, each executing server 112 has a proxy 230, a shared memory 232 having a plurality of slots 234, and a plurality of processes 236. The executing server further includes a plurality of input and output spaces 238 and 240 and a plurality of mark device pairs 246. The mark device pairs have proxy and process mark devices 242 and 244 (see, FIG. 3B). As explained above, the mark devices are virtual device drivers and are maintained in a file system. They are drawn to be included in the shared memory and proxy in FIG. 2 merely for purposes of illustration.

The above components of the executing servers generally function similarly as those of the Web servers 110. One difference is that the processes of executing servers 112 are generally applications for handling requests transmitted by the processes of Web servers 110, whereas the processes of Web servers are generally applications for generating requests to be transmitted to the executing servers. The description provided above with respect to the Web servers, therefore, applies equally to the executing servers.

Figure 4:
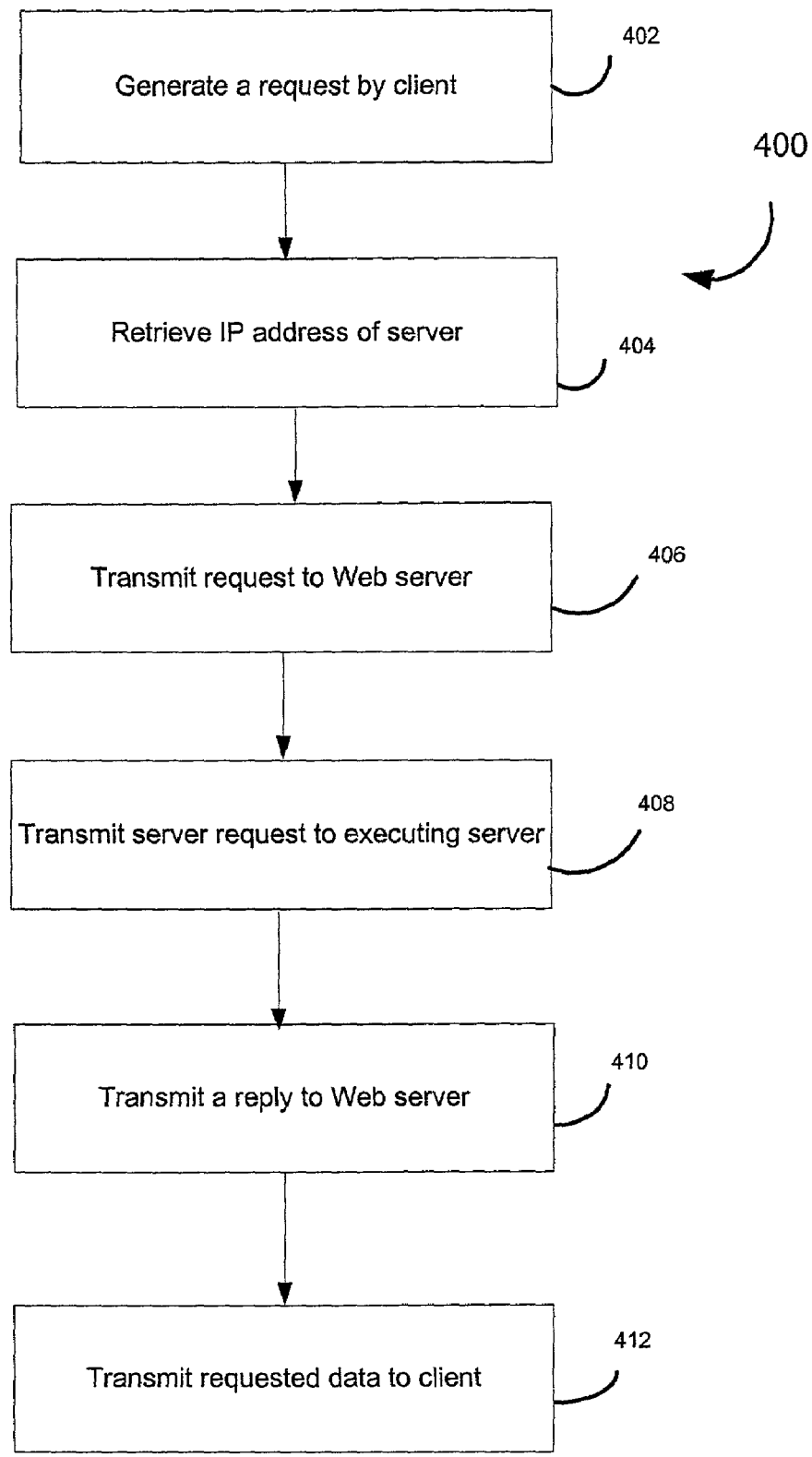
FIG. 4 is a flow chart of a process for data flow in the client-server system of FIG. 1, according to one embodiment of the present invention.

In operation, referring to FIG. 4, a process 400 illustrates an exemplary data flow in client-server system 100 according to one embodiment of the present invention. The process 400 commences with browser 102 issuing a request to server 104 (step 402). One example of such a request is a URL specifying a particular Web page such as "my.yahoo.com," in which case the fully qualified URL would be "http://my.yahoo.com/". The domain name "my.yahoo.com" is submitted to name server 108 to determine actual address for server system 104. Name server 108 returns an Internet Protocol (IP) address of one Web server 110 within server system 104 to the client (step 404). Name server 108 may return IP addresses of the plurality of Web servers 110 in a round-robin fashion to distribute the load evenly over the multiple Web servers 110.

Alternatively, name server 108 may distribute the load more deterministically by tracking browser addresses and hashing the browser address to select a particular Web server for that browser. Under the deterministic or routed approach, any given browser would always access the same Web server 110. This approach allows for more efficient caching of user templates, since more cache hits are likely where a given browser always returns to a particular Web server.

Upon receiving the actual the IP address, the browser submits the URL to the appropriate Web server 110, i.e., to process 206 of the Web server (step 406). When the Web server receives the URL for its root directory, it interprets that as a request for the user's custom summary page. Generally, the identity of user is determined not from the URL, but from a "cookie" provided by browser 102. This ensures that a user can be correctly identified regardless of where he or she logs in. Cookies are strings of data stored by browsers and sent with any request for a URL having a domain associated with the cookie.

In order for the Web server to generate a response to the client's request, it may need to request data from one or more of the executing servers. Examples of such requested data may include stock quotes, new headlines, or banner advertisements. For each such request, the proxy 202 stores the request in slot 214, i.e., output space 218 of the slot, assigned to process 206 to which the request is directed. The proxy also writes to the proxy mark device 220, changing its state from "writable" to "not writable." As a result, the process mark device assigned to the output space 218 changes its state from "not-readable" to "readable." Process 206 is alerted as to the presence of the request in the output space and retrieves the request. In some instances, the request may require services of more than one process and may be routed to two or more processes 206.

In order to put together a "My Yahoo!" page as requested by the browser, Web server 110 needs to retrieve data from many different sources (e.g., information regarding news, stock quotes, weather, sports, etc.). These sources can be processes running on a single executing server or processes spread over multiple executing servers. In some instances, the sources can be processes running on Web servers including those running on the same Web server. In response to the browser's request, the Web server typically generates a plurality of requests ("server request") to be transmitted to one or more of executing servers 112 to generate the "My Yahoo!" page.

The generated server requests are transmitted one at a time to the appropriate destination nodes, generally, processes 236 of the executing servers (step 408). More specifically, the process 206 writes one of the server requests into its input space 216 and writes to the process mark device 222. The process mark device changes its state from "writable" to "not writable." In response to this, the proxy mark device associated with that process mark device changes its state from "not readable" to "readable," alerting proxy 202 that there are data, i.e., the server request, to be transmitted at the input space in question. Subsequently, proxy 202 transmits the server request to the appropriate executing server.

Executing server 112 receives the server request and returns a reply back to process 206 that had sent the server request (step 410). More specifically, proxy 230 of the executing server receives the server request and writes into the output space assigned to process 236 to which the server request is directed. The proxy also writes to the proxy mark device 242 to indicate that the server request has been written into the output space. As a result, the proxy mark device is changed from "writable" state to "not writable" state. The process mark device 244 assigned to the input space in question changes its state from "not-readable" to "readable," alerting process 236 of the server request waiting to be read out.

Process 236 reads the server request and generates a reply which is written into the input space assigned to the process. The process mark device 244 associated with the input space in question changes its state from "writable" to "not-writable." In response to this, the proxy mark device associated with that process mark device changes its state from "not readable" to "readable," alerting the proxy of the reply that needs to be transmitted. Proxy 230 transmits the reply to process 206 that had transmitted the server request. The reply reaches process 206 of the Web server via proxy 202 and output space 218, as explained above in connection with the request sent by the browser. Replies for the other server requests are received by process 206 in a similar fashion. Upon receiving all the replies, the process of the Web server combines the received data and transmits them to the client (step 412).

Sever system 104 is configured to operate in a number of different modes: normal, routed, or keyed, or a combination thereof. Depending on the mode used, Web servers 110 uses different algorithm to access executing servers 112. In the normal mode, Web servers 110 access executing servers 112 in a round-robin fashion to evenly distribute the load. Under this mode, it is assumed that all executing servers 112 provide substantially similar services, so each request can be handled equivalently by any of the executing servers. The goal in routing requests is to provide even load distribution among available executing servers, and tolerance of individual executing server failures.

In the routed mode, Web servers 110 attempt to send similar requests (e.g. requests on behalf of the same user) to the same executing server 112. Like normal mode, in routed mode it is assumed that all executing servers 112 provide substantially similar services, so each request can be handled by any of the executing servers. However, in routed mode, it is assumed that there is benefit in routing repeated requests of the same type to the same executing server. This benefit is usually derived from the reuse of cached results (or partial results) from preceding requests. For example, if user Peterson requests the current share price of the stocks in his saved portfolio, the web server 110 may request the list of stocks in his portfolio from an executing server 112. Executing server 112 may load Petersons's portfolio contents from disk, and cache it in memory to satisfy future requests. If Peterson subsequently refreshes his web page to update the share prices in his portfolio, it is advantageous to route the subsequent request to the same executing server 112 that satisfied the original request, as the portfolio contents are likely still in cache. If the executing server 112 that satisfied the original request is unavailable, it is still possible to route a subsequent request to a different executing server, which can load the portfolio again from a shared disk system.

In the keyed mode, Web servers 110 are directed to send requests to different executing servers depending on the request type. For example, a request for a club photo of Peterson will be always directed to a particular executing server which has access to this photo. Similarly, other executing server specific requests are sent to the corresponding executing servers.

In one embodiment, server system 104 operates under these modes. That is, some Web servers 110 may be operating under the normal mode while others are operating under the routed mode. In some instances, Web servers 110 may communicate via multiple proxy groups, each operating in a different mode. For example, a first proxy group may be operating in the routed mode, a second proxy group may be operating in the keyed mode, and a third proxy group may be operating in the normal mode.

Many variations of the invention will become apparent to those skilled in the art upon review of the disclosure above. The scope of the invention should, therefore, be determined not with reference to the above description, but instead should be determined with reference to the appended claims along with their full scope of equivalents.

What is claimed is:

1. A method of communicating, the method comprising:
    maintaining a connection, via a network, between a first proxy on a first server and a second proxy on a second server;
    while maintaining the connection:
        a plurality of first processes on the first server communicating with a plurality of second processes on the second server via the connection by:
            the plurality of first processes exchanging data with the first proxy via shared memory, wherein each of the plurality of first processes is assigned a unique region of the shared memory, and wherein each unique region of the shared memory has associated therewith a process virtual device driver and a proxy virtual device driver, and wherein each process virtual device driver is configured to cooperate with one of the proxy virtual device drivers to regulate data flow being inputted to and outputted from one of the unique regions of the shared memory; and
        wherein the plurality of first processes exchanging the data with the first proxy includes
            a given process of the plurality of first processes reading from and writing to, under regulation of the process virtual device driver that is associated with the unique region assigned to the given process, the unique region assigned to the given process; and
            the first proxy reading from and writing to, under regulation of the proxy virtual device driver that is associated with the unique region assigned to the given process, the unique region assigned to the given process;
        the first proxy exchanging the data via the connection with the second proxy; and
        the second proxy exchanging the data with the plurality of second processes.

2. The method of claim 1, wherein the plurality of first processes exchanging data with the first proxy via shared memory comprises:
    a first process of the plurality of first processes writing data to a region of the shared memory that is assigned to the first process; and
    the first process causing the state of a process virtual device driver that is associated with the region that is assigned to the first process to change to a first state to indicate that the region is not writeable by the first process, wherein the process virtual device driver has the first state and a second state that indicates that the region is writeable by the first process.

3. The method of claim 2, wherein the plurality of first processes exchanging data with the first proxy via shared memory further comprises:
    prior to the first process writing data to the region of the shared memory that is assigned to the first process, the first process determining whether the region of the shared memory is currently writeable by the first process.

4. The method of claim 3, wherein the first process determining whether the region of the shared memory that is assigned to the first process is currently writeable comprises the first process checking the state of the process virtual device driver.

5. The method of claim 4, further comprising the first process causing the state of a proxy virtual device driver to change to a first state to indicate that the region of the shared memory that is assigned to the first process is readable by the first proxy, wherein the proxy virtual device driver has the first state and a second state that indicates that the region that is assigned to the first process is not readable by the first proxy.

6. The method of claim 5, wherein the first process causing the state of the proxy virtual device driver to change to the first state comprises the first process writing to the process virtual device driver.

7. The method of claim 5, wherein the plurality of first processes exchanging data with the first proxy via shared memory further comprises:
    in response to the proxy virtual device driver changing to the first state, the first proxy determining that there is data to be read from the region of the shared memory that is assigned to the first process.

8. The method of claim 5, wherein the plurality of first processes exchanging data with the first proxy via shared memory further comprises:
    the first proxy reading data from the region of the shared memory that is assigned to the first process; and
    the first proxy causing the proxy virtual device driver to change to the second state.

9. The method of claim 8, further comprising:
    the process virtual device driver changing to the second state in response to the proxy virtual device driver changing to the second state.

10. The method of claim 1, wherein the plurality of first processes exchanging data with the first proxy via shared memory comprises:

a first process of the plurality of first processes reading data from a region of the shared memory that is assigned to the first process; and the first process causing the state of a process virtual device driver to change to a first state to indicate that the region of the shared memory that is assigned to the first process is not readable by the first process, wherein the process virtual device driver has the first state and a second state that indicates that the region of the shared memory that is assigned to the first process is readable by the first process.

11. A communication system, comprising:

a first server comprising:
- a plurality of first processes;
- a first proxy; and
- a first shared memory having a plurality of first slots to store first data to be exchanged between the first processes and the first proxy; each first slot being assigned to one of the first processes;
- a plurality of process virtual device drivers, wherein each first slot of the shared memory has associated therewith one of the process virtual device drivers;
- a plurality of proxy virtual device drivers, wherein each first slot of the shared memory has associated therewith one of the proxy virtual device drivers;
- wherein each process virtual device driver is configured to cooperate with one of the proxy virtual device drivers to regulate data flow being inputted to and outputted from one of the first slots of the shared memory a second server comprising:
- a plurality of second processes;
- a second proxy; and
- a second shared memory having a plurality of second slots to store second data to be exchanged between the second processes and the second proxy; each second slot being assigned to a particular one of the second processes;

wherein the first proxy is configured to maintain a connection, via a network, with the second proxy;

wherein the first proxy and the second proxy are configured to exchange the first data and the second data via the connection to allow the plurality of first processes to communicate with the plurality of second processes; and wherein the first proxy and the plurality of first processes exchange data by:
- a given process of the first processes reading from and writing to, under regulation of the process virtual device driver that is associated with the first slot assigned to the given process, the first slot assigned to the given process; and
- the first proxy reading from and writing to, under regulation of the proxy virtual device driver that is associated with the first slot assigned to the given process, the first slot assigned to the given process.

12. The method of claim 1 wherein the second proxy exchanging data with the plurality of second processes includes the second proxy exchanging data with the plurality of second processes via shared memory.

* * * * *